(12) United States Patent
Wang et al.

(10) Patent No.: US 10,430,949 B1
(45) Date of Patent: Oct. 1, 2019

(54) AUTOMATIC METHOD AND SYSTEM FOR VESSEL REFINE SEGMENTATION IN BIOMEDICAL IMAGES USING TREE STRUCTURE BASED DEEP LEARNING MODEL

(71) Applicant: SHENZHEN KEYA MEDICAL TECHNOLOGY CORPORATION, Shenzhen (CN)

(72) Inventors: Xin Wang, Seattle, WA (US); Youbing Yin, Kenmore, WA (US); Junjie Bai, Seattle, WA (US); Yi Lu, Seattle, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 0 days.

(21) Appl. No.: 16/392,516

(22) Filed: Apr. 23, 2019

Related U.S. Application Data

(60) Provisional application No. 62/662,212, filed on Apr. 24, 2018.

(51) Int. Cl.
| | |
|---|---|
| *G06T 7/11* | (2017.01) |
| *G06T 7/174* | (2017.01) |
| *G06T 7/00* | (2017.01) |
| *G06N 3/08* | (2006.01) |
| *G06N 20/00* | (2019.01) |

(52) U.S. Cl.
CPC .......... *G06T 7/11* (2017.01); *G06N 3/08* (2013.01); *G06N 20/00* (2019.01); *G06T 7/0012* (2013.01); *G06T 7/174* (2017.01); *G06T 2207/20081* (2013.01); *G06T 2207/20084* (2013.01); *G06T 2207/30101* (2013.01)

(58) Field of Classification Search
CPC .......... G06N 20/00; G06N 3/08; G06T 7/174; G06T 7/11; G06T 7/0012; G06T 7/251; G06T 2207/20081; G06T 2207/20084; G06T 2207/30101; A61B 5/021; A61B 5/7267
USPC ....................................................... 382/173
See application file for complete search history.

(56) References Cited

U.S. PATENT DOCUMENTS

| | | | |
|---|---|---|---|
| 9,704,059 B2 * | 7/2017 | Alpert .................. | G06K 9/4671 |
| 2010/0172567 A1 * | 7/2010 | Prokoski .............. | A61B 5/0064 |
| | | | 382/132 |

(Continued)

*Primary Examiner* — Ali Bayat
(74) *Attorney, Agent, or Firm* — Bayes PLLLC

(57) ABSTRACT

Embodiments of the disclosure provide systems and methods for segmenting a biomedical image including at least one tree structure object. The system includes a communication interface configured to receive the biomedical image and a learning model. The biomedical image is acquired by an image acquisition device. The system further includes at least one processor configured to extract a plurality of image patches from the biomedical image and apply the learning model to the plurality of image patches to segment the biomedical image. The learning model includes a convolutional network configured to process the plurality of image patches to construct respective feature maps and a tree structure network configured to process the feature maps collectively to obtain a segmentation mask for the tree structure object. The tree structure network models a spatial constraint of the plurality of image patches.

20 Claims, 7 Drawing Sheets

(56) References Cited

U.S. PATENT DOCUMENTS

| | | | |
|---|---|---|---|
| 2013/0034283 A1* | 2/2013 | Ohishi | A61B 6/032 |
| | | | 382/128 |
| 2015/0003706 A1* | 1/2015 | Eftestol | G06T 7/0012 |
| | | | 382/131 |
| 2015/0227809 A1* | 8/2015 | Alpert | G06K 9/4671 |
| | | | 382/132 |
| 2016/0328855 A1* | 11/2016 | Lay | G06T 5/005 |

* cited by examiner

200

AUTOMATIC METHOD AND SYSTEM FOR VESSEL REFINE SEGMENTATION IN BIOMEDICAL IMAGES USING TREE STRUCTURE BASED DEEP LEARNING MODEL

CROSS-REFERENCE TO RELATED APPLICATION

This application claims the benefit of priority to U.S. Provisional Application No. 62/662,212, filed on Apr. 24, 2018, the entire content of which is incorporated herein by reference.

TECHNICAL FIELD

The present disclosure relates to systems and methods for biomedical image segmentation, and more particularly to, systems and methods for vessel refine segmentation in biomedical images using tree structure based deep learning model.

BACKGROUND

In biomedical image analysis, a fundamental problem is the segmentation of vessel in two-dimensional (2D)/three-dimensional (3D) images, to identify target 2D/3D objects such as coronary vessel tree in CT and MRI images, and blood vessel segmentation in retinal images. Usually, in clinical practice, a vessel is manually segmented by expert operators, which is labor intensive and time-consuming, and the segmentation results may be subjective. Therefore, automatic computer-assisted segmentation is being developed to offer more reliable and consistent segmentation of vessels.

For example, combined patch-based CNNs with supervised decision fusion is applied to 2D image patches in an image for the analysis of the whole image. However, such conventional methods treat the 2D image patches as inputs independently. These methods ignore that image patches and their neighbors usually follow spatial patterns that are vital for the inference. For example, when a pixel is in the vessel region, its neighboring pixel also has a high probability to be labeled as vessel, since they are close to each other spatially. In addition, conventional segmentation methods process neighboring patches sequentially. That results in difficulties processing vessel bifurcation regions, which are very common in vessel tree analysis, such as coronary vessel tree segmentation.

Embodiments of the disclosure address the above problems by methods and systems for vessel refine segmentation using tree structure based deep learning model.

SUMMARY

A novel deep learning-based architecture is disclosed to handle the challenging automatic segmentation task based on the tree structure nature of vessels.

In one aspect, embodiments of the disclosure provide a system for segmenting a biomedical image including at least one tree structure object. The system includes a communication interface configured to receive the biomedical image and a learning model. The biomedical image is acquired by an image acquisition device. The system further includes at least one processor configured to extract a plurality of image patches from the biomedical image and apply the learning model to the plurality of image patches to segment the biomedical image. The learning model includes a convolutional network configured to process the plurality of image patches to construct respective feature maps and a tree structure network configured to process the feature maps collectively to obtain a segmentation mask for the tree structure object. The tree structure network models a spatial constraint of the plurality of image patches.

In another aspect, embodiments of the disclosure also provide a method for segmenting a biomedical image including at least one tree structure object. The method includes receiving the biomedical image and a learning model. The biomedical image is acquired by an image acquisition device. The method further includes extracting, by at least one processor, a plurality of image patches from the biomedical image. The method also includes applying, by the at least one processor, the learning model to the plurality of image patches to segment the biomedical image. The learning model includes a convolutional network configured to process the plurality of image patches to construct respective feature maps and a tree structure network configured to process the feature maps collectively to obtain a segmentation mask for the tree structure object. The tree structure network models a spatial constraint of the plurality of image patches.

In yet another aspect, embodiments of the disclosure further provide a non-transitory computer-readable medium having instructions stored thereon that, when executed by at least one processor, causes the at least one processor to perform a method for segmenting a biomedical image including at least one tree structure object. The method includes receiving the biomedical image and a learning model. The biomedical image is acquired by an image acquisition device. The method further includes extracting a plurality of image patches from the biomedical image. The method also includes applying the learning model to the plurality of image patches to segment the biomedical image. The learning model includes a convolutional network configured to process the plurality of image patches to construct respective feature maps and a tree structure network configured to process the feature maps collectively to obtain a segmentation mask for the tree structure object. The tree structure network models a spatial constraint of the plurality of image patches.

In some embodiments, the tree structure object is a blood vessel that has a tree structure, such as a coronary vessel, or a retinal vessel.

In some embodiments, the convolutional network is a fully convolutional network (e.g., a Unet) and the tree structure network is a tree structure convolution Recurrent Neural Network (RNN), e.g., a Long-Short Term Memory (LSTM), a Gated Recurrent Unit (GRU), etc.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings.

The disclosed systems and methods use an end-to-end, unified learning model for modeling tree-structure data to solve image segmentation problems. In some embodiments, this end-to-end learning model may include two stages: a convolutional network configured to process the image patches to construct respective feature maps and a tree structure network configured to process the feature maps collectively to obtain a segmentation mask for the tree structure object. The tree structure network models a spatial constraint of the image patches. In some embodiments, the convolutional network produces a feature map as the output, which is used by the tree structure network as the input. The tree structure network then provides a segmentation mask or a probability map as the output of the end-to-end learning model.

The disclosed systems and methods not only consider the appearances of each image patch independently, but also embed tree structured spatial relationships between neighboring image patches in the deep architecture. For example, the successive slices along vessel have dependencies on each other and thus, vessel segmentation at adjacent slices need to have consistent shape. The disclosed learning model explicitly models this spatial constraint, which performs segmentation on an image by integrating segmentation predictions of the neighboring image patches in the image. With the information propagation of the nodes in the tree structure deep network, the disclosed systems and methods can seamlessly integrate the information from the successive image patches to make a better prediction.

Such an end-to-end approach is straightforward and flexible to learn. It allows modeling for data of varying structures. For example, sequence structure is only a special case of tree structure. In some embodiments, the disclosed tree-structure trained model predicts segmentation for all image patches on the coronary tree simultaneously. It avoids potential errors caused by post processing. In some embodiments, the disclosed system uses convolution RNN to avoid the spatial information being encoded in the output of fully convolutional network during learning process.

Figure 1:
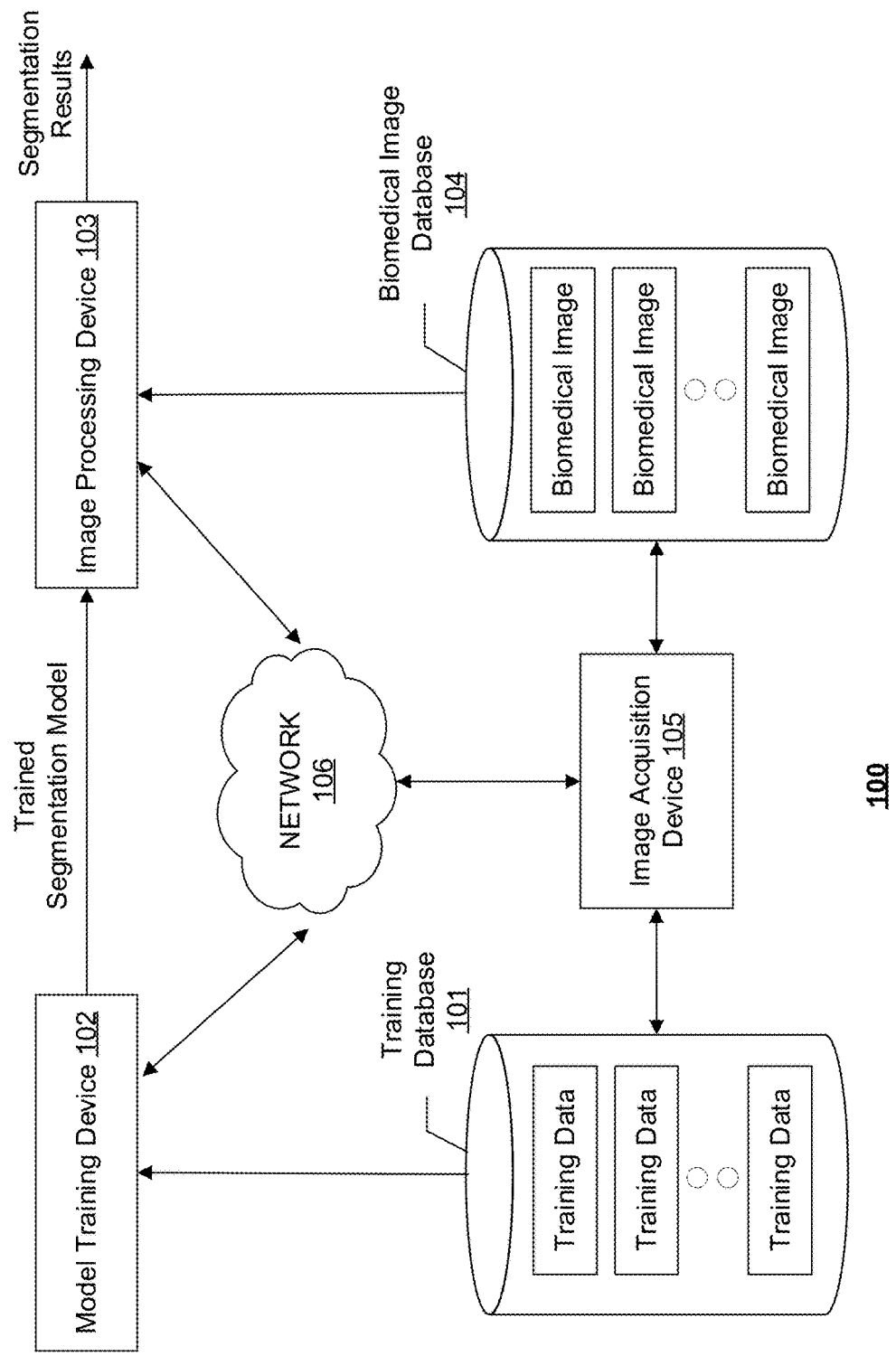
FIG. 1 illustrates a schematic diagram of an exemplary image segmentation system, according to embodiments of the disclosure.

FIG. 1 illustrates an exemplary image segmentation system 100, according to some embodiments of the present disclosure. Consistent with the present disclosure, image segmentation system 100 is configured to segment a biomedical image acquired by an image acquisition device 105. In some embodiments, image acquisition device 105 may be using one or more imaging modalities, including, e.g., Magnetic Resonance Imaging (MRI), Computed Tomography (CT), functional MRI (e.g., fMRI, DCE-MRI and diffusion MRI), Cone Beam CT (CBCT), Positron Emission Tomography (PET), Single-Photon Emission Computed Tomography (SPECT), X-ray, Optical Coherence Tomography (OCT), fluorescence imaging, ultrasound imaging, and radiotherapy portal imaging, etc. In some embodiments, image acquisition device 105 may capture images containing at least one tree structure object, such as blood vessels. For example, image acquisition device 105 may be an MRI scanner or a CT scanner that captures coronary vessel images, or an OCT device that captures retinal vessel images. In some embodiments, the biomedical image captured may be two dimensional (2D) or three dimensional (3D) images. A 3D image may contain multiple 2D image slices.

As shown in FIG. 1, image segmentation system 100 may include components for performing two phases, a training phase and a prediction phase. To perform the training phase, image segmentation system 100 may include a training database 101 and a model training device 102. To perform the prediction phase, image segmentation system 100 may include an image processing device 103 and a biomedical image database 104. In some embodiments, image segmentation system 100 may include more or less of the components shown in FIG. 1. For example, when a segmentation model for segmenting the biomedical images is pre-trained and provided, image segmentation system 100 may include only image processing device 103 and biomedical image database 104.

Image segmentation system 100 may optionally include a network 106 to facilitate the communication among the various components of image segmentation system 100, such as databases 101 and 104, devices 102, 103, and 105. For example, network 106 may be a local area network (LAN), a wireless network, a cloud computing environment (e.g., software as a service, platform as a service, infrastructure as a service), a client-server, a wide area network (WAN), etc. In some embodiments, network 106 may be replaced by wired data communication systems or devices.

In some embodiments, the various components of image segmentation system 100 may be remote from each other or in different locations, and be connected through network 106 as shown in FIG. 1. In some alternative embodiments, certain components of image segmentation system 100 may be located on the same site or inside one device. For example, training database 101 may be located on-site with or be part of model training device 102. As another example, model training device 102 and image processing device 103 may be inside the same computer or processing device.

Model training device 102 may use the training data received from training database 101 to train a segmentation model for segmenting a biomedical image received from, e.g., biomedical image database 104. As shown in FIG. 1, model training device 102 may communicate with training database 101 to receive one or more sets of training data. Each set of training data may include image patches extracted from a biomedical image and its corresponding ground truth segmentation mask that provides the segmentation result to each image patch.

Figure 2:
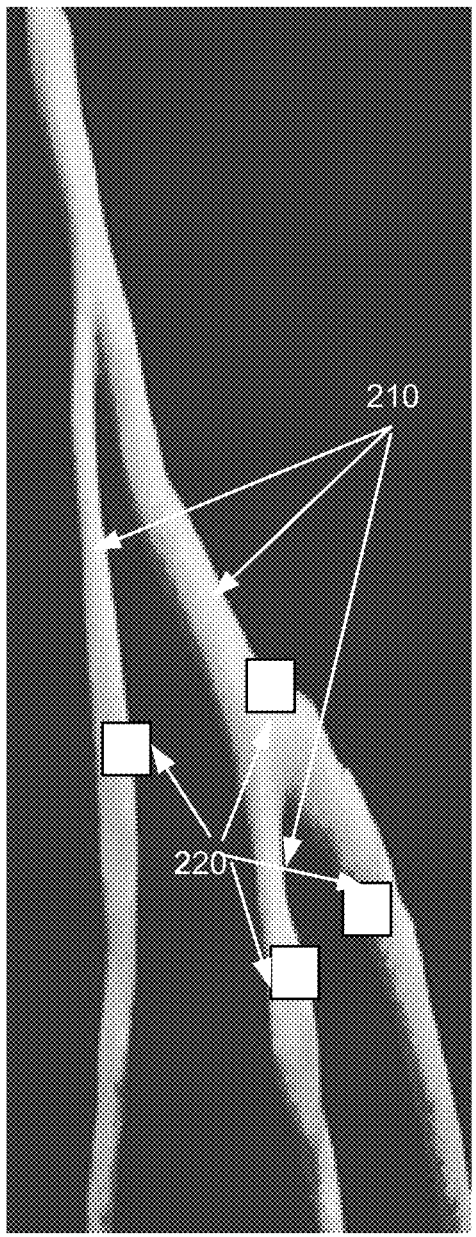
FIG. 2 illustrates an exemplary biomedical image of a coronary vessel, according to embodiments of the disclosure.

Training images stored in training database 101 may be obtained from a biomedical image database containing previously acquired images of tree structure objects. The training images can be 2D or 3D images. In some embodiments, the biomedical image may be segmented by model training device 102 to identify a centerline of the tree structure object, and extract image patches along the centerline. For example, an initial artery segmentation may be performed and verified by experts. For example, FIG. 2 illustrates an exemplary biomedical image 200 of a coronary vessel, according to embodiments of the disclosure. Biomedical image 200 may be obtained through the initial segmentation. Based on biomedical image 200, a centerline 210 can be extracted. Consistent with the present disclosure, a "centerline" may be a skeleton line of the vessel that generally tracks the tree structure, including the "trunk" and the "branches." Image patches 220 are then extracted along centerline 210. In some embodiments, the image patches may be pre-extracted and saved in training database 101 as training data. A set of image patches extracted from the same biomedical image may be associated in training database 101.

In some embodiments, the ground truth can be a series of segmentation masks along the vessel path. The training images are previously segmented or annotated by expert operators with each pixel/voxel classified and labeled, e.g., with value 1 if the pixel/voxel belongs to a vessel or value 0 if otherwise. In some embodiments, the ground truth may be probability maps where each pixel/voxel is associated with a probability value indicating how likely the pixel/voxel belong to the vessel. The aim of the training phase is to learn a mapping between the image patches and the ground truth segmentation mask by finding the best fit between predictions and ground truth values over the sets of training data.

In some embodiments, the training phase may be performed "online" or "offline." An "online" training refers to performing the training phase contemporarily with the prediction phase, e.g., learning the model in real-time just prior to segmenting a biomedical image. An "online" training may have the benefit to obtain a most updated learning model based on the training data that is then available. However, an "online" training may be computational costive to perform and may not always be possible if the training data is large and/or the model is complicate. Consistent with the present disclosure, an "offline" training is used where the training phase is performed separately from the prediction phase. The learned model trained offline is saved and reused for segmenting images.

Model training device 102 may be implemented with hardware specially programmed by software that performs the training process. For example, model training device 102 may include a processor and a non-transitory computer-readable medium (discussed in detail in connection with FIG. 3). The processor may conduct the training by performing instructions of a training process stored in the computer-readable medium. Model training device 102 may additionally include input and output interfaces to communicate with training database 101, network 106, and/or a user interface (not shown). The user interface may be used for selecting sets of training data, adjusting one or more parameters of the training process, selecting or modifying a framework of the learning model, and/or manually or semi-automatically providing prediction results associated with an image for training.

Consistent with some embodiments, the segmentation model may be a machine learning model that include at least two stages: a convolutional network configured to process the image patches to construct feature maps and a tree structure network configured to process the feature maps collectively to obtain a segmentation mask for the tree structure object. However, it is contemplated that the structure of the learning model is not limited to what is disclosed as long as the learning model encodes a spatial relationship in a tree structure among the image patches.

In some embodiments, the convolutional network may be a Fully Convolutional Network (FCN), e.g., a Unet. Consistent with the present disclosure, the tree structure network may be a Tree Structure Convolution Recurrent Neutral Network (CRNN). In some embodiments, tree structure network may also be a Long Short Term Memory (LSTM) or a Gated Recurrent Unit (GRU).

Figure 4:
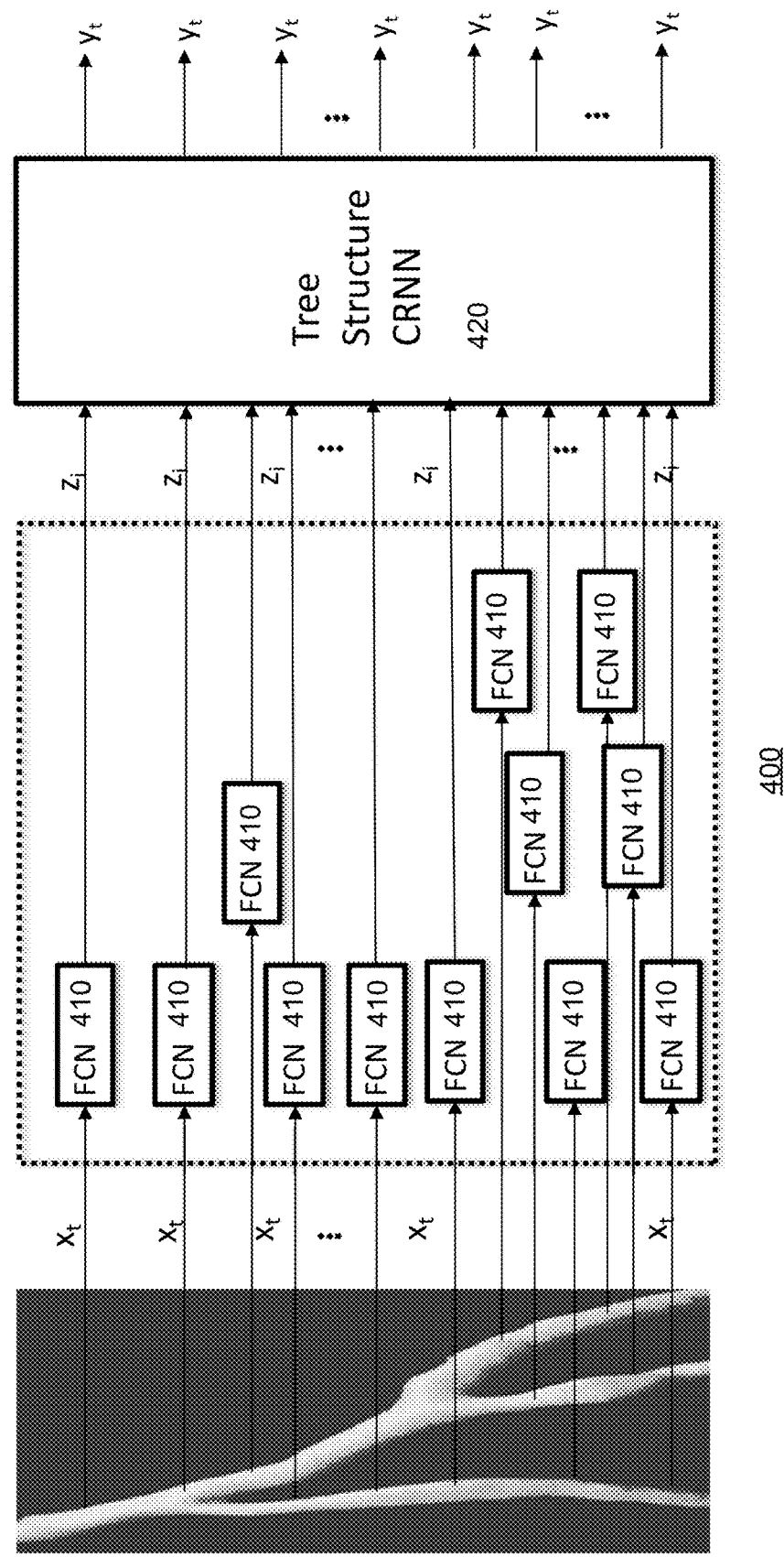
FIG. 4 illustrates a schematic diagram of an exemplary tree structure based deep learning model, according to embodiments of the disclosure.

FIG. 4 illustrates a schematic diagram of an exemplary tree structure based deep learning model 400, according to embodiments of the disclosure. As shown by FIG. 4, tree structure based deep learning model 400 consists of two components to form an end-to-end trainable network: an FCN 410 and a Tree Structure CRNN 420. Fully convolutional network 410 aims to construct a feature map for each 2D image patch, from which object-relevant information will be extracted. Tree Structure CRNN 420 aims to handle the spatial constraint in the tree structure.

Tree structure based deep learning model 400 generally performs a mapping (or transformation) $S:\{x_1, x_2, x_2, \ldots, x_T\} \rightarrow \{y_1, y_2, \ldots, y_T\}$, where training image patches $\{x_1, x_2, \ldots, x_T\}$ are the input to model 400 and respective ground truths $\{y_1, y_2, \ldots, y_T\}$ are the output. Tree structure based deep learning model 400 works by passing each input $x_t$, through a transformation $M(x_t)$ performed by FCN 410, to produce feature maps $z_t$. The outputs $z_t$ are then passed into Tree Structure CRNN 420.

The architecture of FCN 410 may include a stack of distinct layers (not shown) that transform the input into the output. Examples of the different layers may include one or more convolution layers or fully-convolutional layers, non-linear operator layers, pooling or subsampling layers, fully connected layers, and/or final loss layers. Each layer may connect one upstream layer and one downstream layer. FCN 410 receives the training image patches $\{X_1, x_2, \ldots, x_T\}$ and produces respective feature maps $\{z_1, z_2, \ldots, z_T\}$, from which object-relevant information will be extracted.

In some embodiments, as shown in FIG. 4, FCN 410 is applied to the image patches simultaneously so that the transformation M is performed on the image patches in parallel. It may avoid potential errors caused by post processing. Parallel processing may also save computation time of FCN 410.

The feature maps $\{z_1, z_2, \ldots, z_T\}$ are provided as inputs to the next stage of the segmentation model, Tree Structure CRNN 420, to produce a prediction result $\hat{y}$ at each position t. Tree Structure CRNN 420 aims to handle the spatial constraint in the tree structure object. In some embodiments, the spatial constraint is defined by the spatial relationship of the image patches within a 2D image slice, e.g., whether an image patch belongs to the vessel has an implication on whether the image patch spatially adjacent to it may also belong to the vessel. In some embodiments, the spatial constraint may also be defined by the spatial relationship across multiple 2D image slice, e.g., whether an image patch in one image slice belongs to the vessel has an implication on whether the corresponding image patch in its spatially adjacent image slice may also belong to the vessel. In some embodiments, the spatial constraint also limits the image patches that belong to the vessel to follow a tree structure. Accordingly, the tree-like nature of vessels is encoded in the Tree Structure CRNN 420, and thus tree structure based deep learning model 400.

Figure 5:
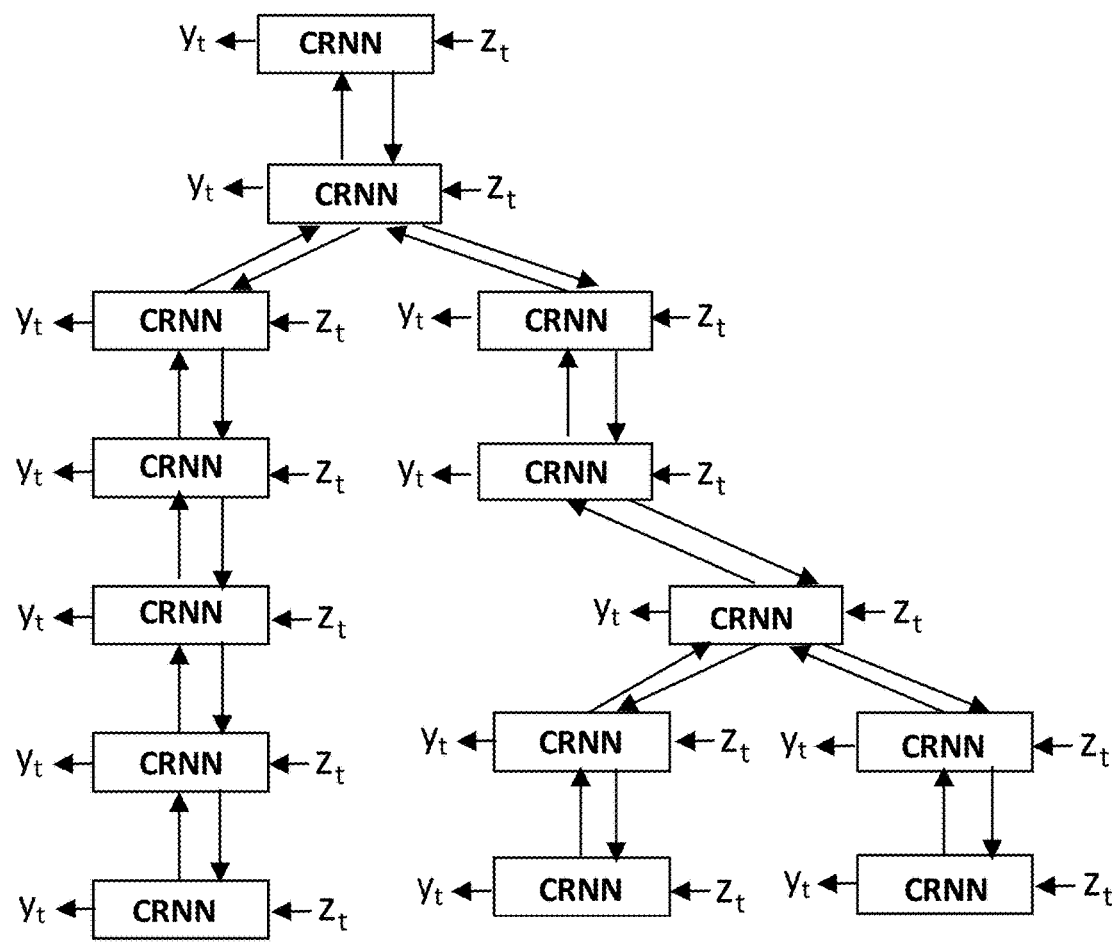
FIG. 5 illustrates a schematic diagram of an exemplary bidirectional Convolution RNN architecture, according to embodiments of the disclosure.

In some embodiments, Tree Structure CRNN 420 can be implemented with single direction either from the root to the terminals or from the terminals to the root. It can also be implemented by considering both directions. For example, FIG. 5 illustrates a schematic diagram of an exemplary bidirectional Convolution RNN 500, according to embodiments of the disclosure. It can be trained using all available input information from both upstream and the downstream of the tree structure. Additional depth can be added by stacking them on top of each other.

Consistent with the present disclosure, model training device 102 jointly trains the convolutional network and the tree structure network, using the training data from training database 101. In other words, the end-to-end network is trained as one piece rather than the different stages separately. As information propagates among the nodes in the tree structure network during the joint training, the jointly trained network can integrate information of the neighboring image patches in the image and provide a better prediction. Therefore, when later used to segment a new biomedical image, the segmentation models can leverage the tree structure information to aid the segmentation.

As used herein, "training" a learning model refers to determining one or more parameters of at least one layer in the learning model. For example, a convolutional layer of an FCN model may include at least one filter or kernel. One or more parameters, such as kernel weights, size, shape, and structure, of the at least one filter may be determined by e.g., a backpropagation-based training process. The segmentation model may be trained using supervised learning, semi-supervised learning, or unsupervised learning.

For example, returning to FIG. 4, the parameters (V, W) of the fully convolutional network 410 and Tree Structure CRNN 420 can be jointly optimized by minimizing a cost function of the ground truth outputs $y_t$ and the predicted values $\hat{y}$ for each image patch t. In particular, for a training set D, parameters (V, W) may be optimized to minimize a cost function of y and $\hat{y}$. In some embodiments, the cost function may be the mean square error between y and $$\hat{y}: J(V, W) = \frac{1}{d}\sum_{k=1}^{d} \|y - \hat{y}\|_2.$$

In some embodiments, tree structure based deep learning model 400 can be trained using stochastic gradient descent related methods, with backpropagation used to compute the gradient $\nabla_{V,W} L(V, W)$ of the cost function J with respect to all parameters (V, W) over mini batches sampled from the training dataset.

Returning to FIG. 1, the trained segmentation model may be used by image processing device to segment new biomedical images. Image processing device 103 may receive the segmentation model, e.g., tree structure based deep learning model 400, from model training device 102. Image processing device 103 may include a processor and a non-transitory computer-readable medium (discussed in detail in connection with FIG. 3). The processor may perform instructions of an image segmentation process stored in the medium. Image processing device 103 may additionally include input and output interfaces (discussed in detail in connection with FIG. 3) to communicate with biomedical image database 104, network 106, and/or a user interface (not shown). The user interface may be used for selecting a biomedical image for segmentation, initiating the segmentation process, displaying the biomedical image and/or the segmentation results.

Image processing device 103 may communicate with biomedical image database 104 to receive one or more biomedical images. In some embodiments, the biomedical images stored in biomedical image database 104 may include 2D image slices from a 3D scan. The biomedical images may be acquired by image acquisition devices 105. Image processing device 103 may perform an initial artery segmentation to locate a rough profile of the vessel structure. Based on the initial segmentation, image processing device 103 then extracts a centerline of the vessel and extracts multiple image patches along the centerline. Image processing device 103 then uses the trained segmentation model received from model training device 102 to predict whether the image patches belong to the vessel, and outputs a segmentation mask of the biomedical image.

Figure 3:
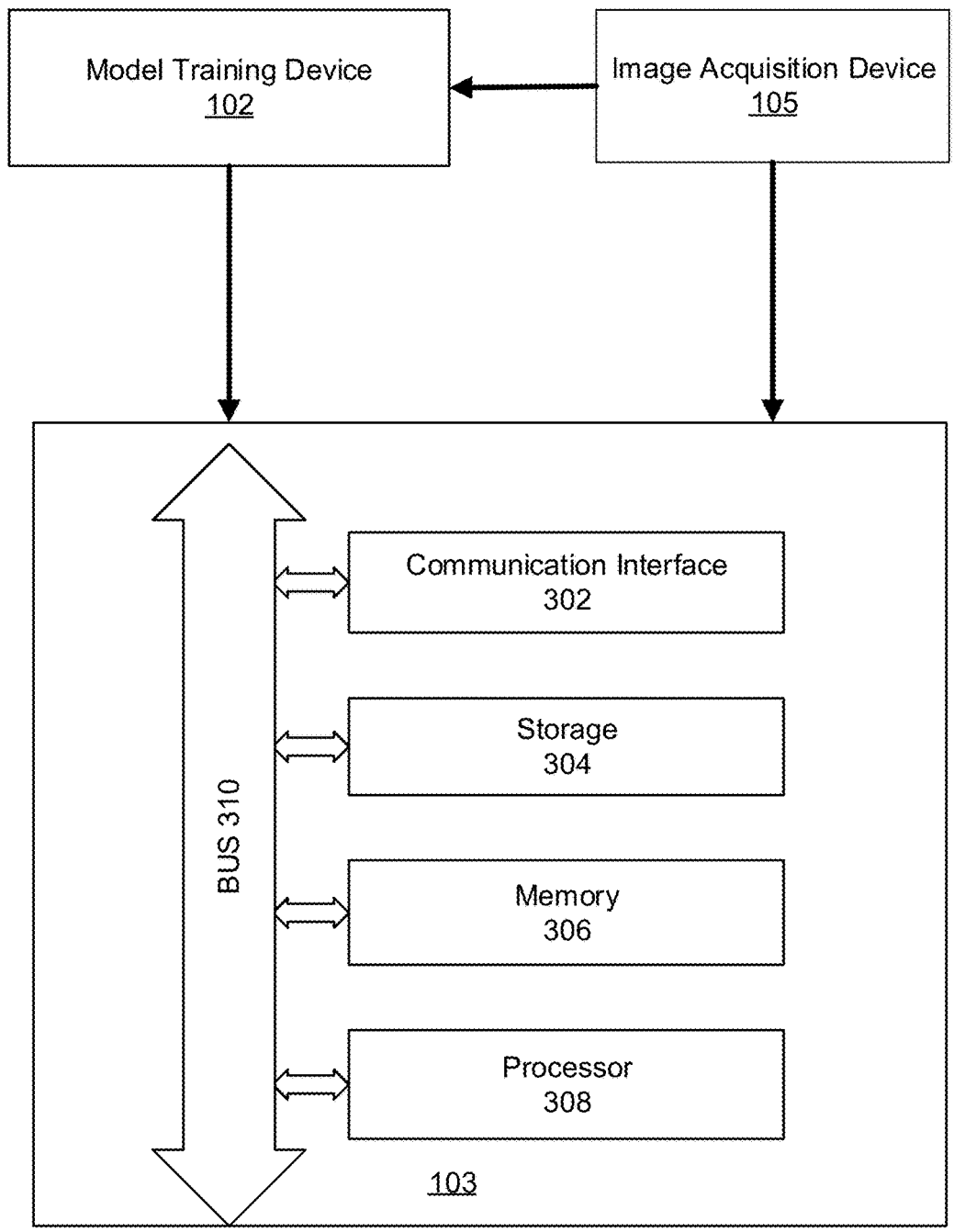
FIG. 3 illustrates a block diagram of an exemplary image processing device, according to embodiments of the disclosure.

FIG. 3 illustrates an exemplary image processing device 103, according to some embodiments of the present disclosure. In some embodiments, image processing device 103 may be a special-purpose computer, or a general-purpose computer. For example, image processing device 103 may be a computer custom-built for hospitals to perform image acquisition and image processing tasks. As shown in FIG. 3, image processing device 103 may include a communication interface 302, a storage 304, a memory 306, a processor 308, and a bus 310. Communication interface 302, storage 304, memory 306, and processor 308 are connected with bus 310 and communicate with each other through bus 310.

Communication interface 302 may include a network adaptor, a cable connector, a serial connector, a USB connector, a parallel connector, a high-speed data transmission adaptor, such as fiber, USB 3.0, thunderbolt, and the like, a wireless network adaptor, such as a WiFi adaptor, a telecommunication (3G, 4G/LTE and the like) adaptor, etc. Image processing device 103 may be connected to other components of image segmentation system 100 and network 106 through communication interface 302. In some embodiments, communication interface 302 receives biomedical image from image acquisition device 105. The biomedical image captures a tree structure object, such as a vessel. For example, the biomedical image may be a coronary vessel image or a retinal vessel image. In some embodiments, communication interface 302 also receives the segmentation model, e.g., tree structure based deep learning model 400, from modeling training device 102.

Storage 304/memory 306 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories (RAMs), a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information or instructions capable of being accessed by a computer device, etc.

In some embodiments, storage 304 may store the trained learning model, e.g., tree structure based deep learning model 400, and data, such as extracted image patches and feature maps generated while executing the computer programs, etc. In some embodiments, memory 306 may store computer-executable instructions, such as one or more image processing programs. In some embodiments, multiple image patches may be extracted along the centerline of the tree structure object in a biomedical image stored in storage 304. The image patches may be read from storage 304 one by one or simultaneously and stored in memory 306.

Processor 308 may be a processing device that includes one or more general processing devices, such as a microprocessor, a central processing unit (CPU), a graphics processing unit (GPU), and the like. More specifically, the processor may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor may also be one or more dedicated processing devices such as application specific integrated circuits (ASICs), field programmable gate arrays (FPGAs), digital signal processors (DSPs), system-on-chip (SoCs), and the like. Processor 308 may be communicatively coupled to memory 306 and configured to execute the computer-executable instructions stored thereon.

In some embodiments, processor 308 is configured to segment the biomedical image. For example, processor 308 first perform an initial artery segmentation to find the vessel structure. Based on the initial segmentation, processor 308 then extracts a centerline of the vessel and extracts multiple image patches along the centerline. Processor 308 then uses the trained segmentation model, such as tree structure based deep learning model 400, to predict whether the image patches belong to the vessel, and outputs a segmentation mask of the biomedical image. The trained segmentation model may include an FCN (e.g., FCN 410) and a Tree Structure CRNN (e.g., Tree Structure CRNN 420) encoded with spatial constraint reflecting the tree structure of the object in the biomedical image. Applying the segmentation model to the image patches may include applying the FCN and the Tree Structure CRNN sequentially. For example, FCN 410 is applied to the image patches in parallel to produce respective feature maps, and then Tree Structure CRNN 420 is applied to the feature maps to produce the segmentation mask. In some embodiments, Tree Structure CRNN 420 may produce a probability map indicating the probability each pixel in the image patch belongs to the tree structure object. Processor 308 may then perform a thresholding to obtain a segmentation mask. For example, processor 308 may set pixels with probabilities above 0.8 as 1 (i.e., belong to the tree structure object) and the remaining pixels as 0 (i.e., not belong to the tree structure object). The threshold may be set by an operator or automatically selected by processor 308. An exemplary image segmentation process will be described in connection with FIG. 7.

Consistent with the present disclosure, model training device 102 can have same or similar structures as image processing device 103. In some embodiments, model training device 102 includes a processor, among other components, configured to jointly train the FCN and the Tree Structure CRNN using training images. An exemplary network training process will be described in connection with FIG. 6.

Figure 6:
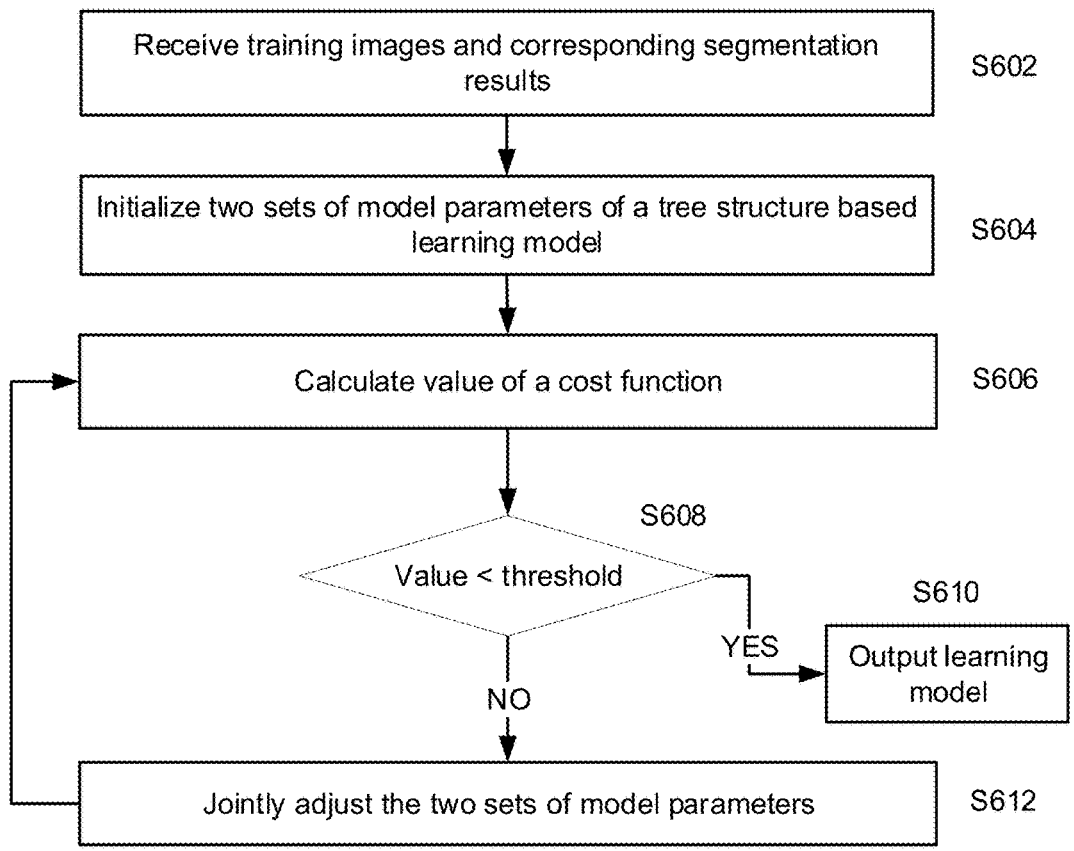
FIG. 6 is a flowchart of an exemplary method for training a tree structure based learning model, according to embodiments of the disclosure.

FIG. 6 is a flowchart of an exemplary method 600 for training a tree structure based learning model, according to embodiments of the disclosure. For example, method 600 may be implemented by model training device 102 in FIG. 1. However, method 600 is not limited to that exemplary embodiment. Method 600 may include steps S602-S612 as described below. It is to be appreciated that some of the steps may be optional to perform the disclosure provided herein. Further, some of the steps may be performed simultaneously, or in a different order than shown in FIG. 6.

In step S602, model training device 102 may communicate with training database 101 to receive one or more sets of training data. Each set of training data may include training image patches extracted from a biomedical image and its corresponding ground truth segmentation mask that provides the segmentation result to each image patch.

In step S604, model training device 102 may initialize the parameters of a tree structure based learning model. Training the learning model is a process of determining one or more parameters of the learning model. Consistent with the present disclosure, model training device 102 jointly trains the convolutional network and the tree structure network, using the training data from training database 101. That is, the set of parameters of the two networks are trained together. For example, set of parameters V of the fully convolutional network 410 and set of parameters W of Tree Structure CRNN 420 can be jointly trained. The parameters may be initially set to certain values. The initial values may be predetermined, selected by an operator, or decided by model training device 102 based on prior experience of similar images. For example, parameters of a learning model previously trained for coronary vessel image of patient A may be used as initial values for the parameters of the learning model being trained for coronary vessel image of patient B.

In step 606, model training device 102 may calculate the value of a cost function. In some embodiments, the cost function may be the mean square error between y and $$\hat{y}: J(V, W) = \frac{1}{d}\sum_{k=1}^{d} \|y - \hat{y}\|_2,$$

where $y_t$ is the ground truth outputs contained in the training data and $\hat{y}$ is the predicted values for each image patch t.

In step S608, the calculated value may be compared with a predetermined threshold. The predetermined threshold is also known as the stopping criteria for interactive methods. The smaller it is, the more optimal the parameters, but the longer it takes (i.e., more iterations) for the computation to converge. Therefore, the threshold may be selected to balance the accuracy of the prediction and the computational cost.

If the value is below the predetermined threshold (step S608: Yes), the method is considered as have converged, and the cost function is minimized. In step S610, model training device 102 outputs the learning model with the optimized sets of parameters and method 600 concludes. Otherwise (step S608: No), model training device 102 may further adjust the two sets of parameters jointly in step S612. In some embodiments, a stochastic gradient descent related method with backpropagation may be used. For example, the parameters L(V, W) may be adjust with a gradient $\nabla_{V,W}$ L(V, W) of the cost function J with respect to all parameters (V, W) over mini batches sampled from the training dataset. Method 600 may return to step S606 to calculate value of the cost function based on outputs obtained from the learning model with the adjusted sets of parameters. Each pass of steps S606-S612 is considered as one iteration. Method 600 iterates until the value of the cost function is reduced to below the predetermined threshold (step S608).

Figure 7:
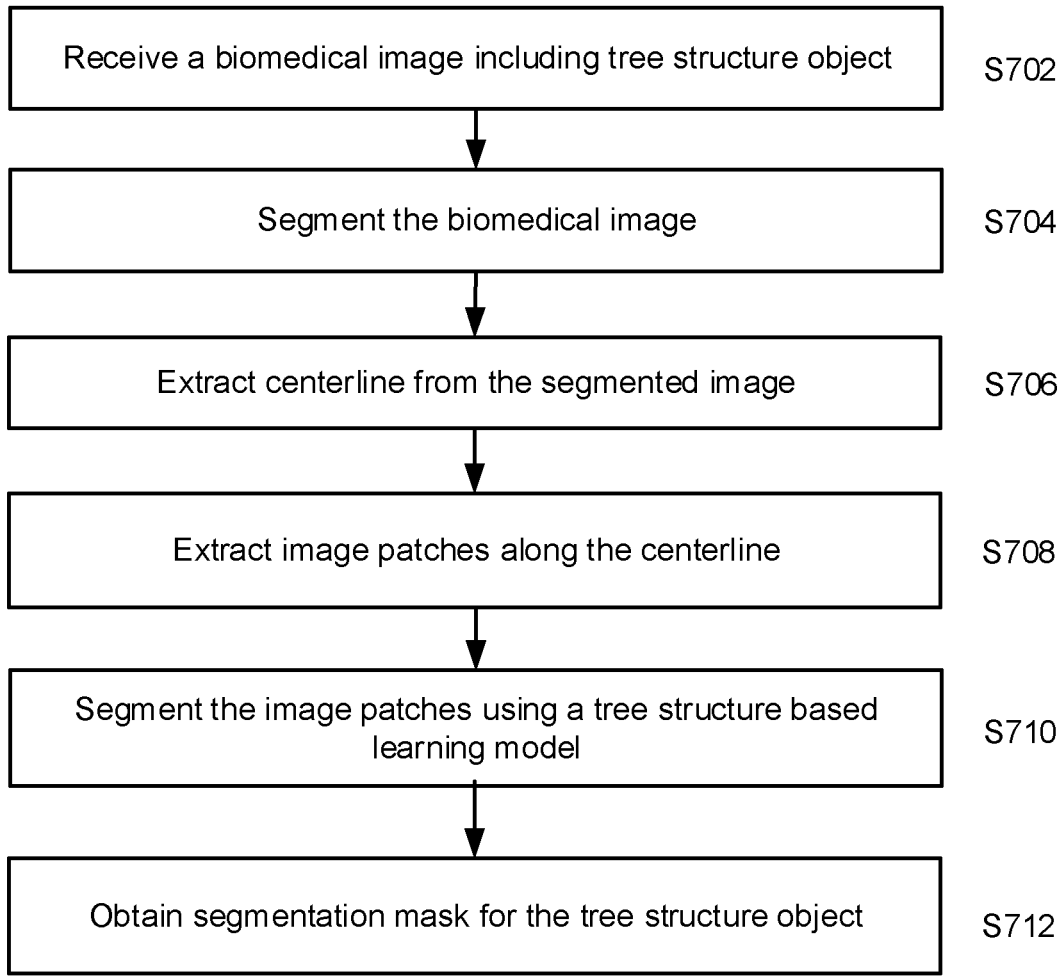
FIG. 7 is a flowchart of an exemplary method for biomedical image segmentation using a tree structure based learning model, according to embodiments of the disclosure.

FIG. 7 is a flowchart of an exemplary method 700 for biomedical image segmentation using a tree structure based learning model, according to embodiments of the disclosure. For example, method 700 may be implemented by image processing device 103 in FIG. 1. However, method 700 is not limited to that exemplary embodiment. Method 700 may include steps S702-S712 as described below. It is to be appreciated that some of the steps may be optional to perform the disclosure provided herein. Further, some of the steps may be performed simultaneously, or in a different order than shown in FIG. 7.

In step S702, image processing device 103 receives a biomedical image, e.g., from biomedical image database 104. The biomedical image captures a tree structure object, such as a blood vessel. Image processing device 103 may additionally receive a segmentation model, e.g., tree structure based deep learning model 400. The segmentation model may be trained using method 600.

In step S704, image processing device 103 segments the biomedical image. In some embodiments, an initial artery segmentation may be performed to locate a profile of the tree structure object. In step S706, image processing device 103 extracts a centerline from the segmented image. For example, the centerline tracks the passageways of the vessel structure.

In step S708, image processing device 103 extracts image patches along the centerline. An image patch may be square and includes multiple pixels, which may also be referred as a superpixel. For example, the image patches may be 4×4, 8×8, 16×16, or 32×32 in size.

In step S710, image processing device 103 segments the image patches using a tree structure based learning model, e.g., model 400. The learning model takes the image patches as inputs and produce a segmentation mask for the tree structure object (step S712). In some embodiments, image processing device 103 may segment the image patches using an FCN and a Tree Structure CRNN sequentially. For example, FCN 410 is first applied to the image patches in parallel to produce respective feature maps, and then Tree Structure CRNN 420 is applied to the feature maps to produce the segmentation mask. In some embodiments, Tree Structure CRNN 420 may produce a probability map indicating the probability each pixel in the image patch belongs to the tree structure object. Image processing device may then perform a thresholding to obtain a segmentation mask.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for segmenting a biomedical image including at least one tree structure object, comprising:
   a communication interface configured to receive the biomedical image and a learning model, the biomedical image being acquired by an image acquisition device; and
   at least one processor, configured to:
   extract a plurality of image patches from the biomedical image; and
   apply the learning model to the plurality of image patches to segment the biomedical image, wherein the learning model includes a convolutional network configured to process the plurality of image patches to construct respective feature maps and a tree structure network configured to process the feature maps collectively to obtain a segmentation mask for the tree structure object, wherein the tree structure network models a spatial constraint of the plurality of image patches.

2. The system of claim 1, wherein to extract the plurality of image patches, the at least one processor is further configured to:
   determine a centerline of the tree structure object in the biomedical image; and
   extract the plurality of image patches along the centerline.

3. The system of claim 1, wherein the convolutional network includes a plurality of fully convolutional networks each configured to process an image patch.

4. The system of claim 3, wherein the plurality of fully convolutional networks process the plurality of image patches in parallel.

5. The system of claim 1, wherein the tree structure network is a tree structure convolution recurrent neural network.

6. The system of claim 1, wherein the spatial constraint is determined based on a tree structure of the image patches.

7. The system of claim 1, wherein the spatial constraint is determined based on a spatial relationship between two neighboring image patches among the plurality of image patches.

8. The system of claim 1, wherein the convolutional network and the tree structure network are trained jointly using a gradient descent based method.

9. The system of claim 1, wherein the tree structure object is a blood vessel.

10. The system of claim 1, wherein the biomedical image is a 3D image including a plurality of 2D image slices, wherein the plurality of image patches are extracted across the plurality of 2D image slices, wherein the spatial constraint is determined based on a spatial relationship of the plurality of 2D image slices.

11. A method for segmenting a biomedical image including at least one tree structure object, comprising:
   receiving the biomedical image and a learning model, the biomedical image being acquired by an image acquisition device;
   extracting, by at least one processor, a plurality of image patches from the biomedical image; and
   applying, by the at least one processor, the learning model to the plurality of image patches to segment the biomedical image, wherein the learning model includes a convolutional network configured to process the plurality of image patches to construct respective feature maps and a tree structure network configured to process the feature maps collectively to obtain a segmentation mask for the tree structure object, wherein the tree structure network models a spatial constraint of the plurality of image patches.

12. The method of claim 11, wherein extracting the plurality of image patches further includes:
   determining a centerline of the tree structure object in the biomedical image; and
   extracting the plurality of image patches along the centerline.

13. The method of claim 11, wherein the convolutional network includes a plurality of fully convolutional networks each configured to process an image patch.

14. The method of claim 13, wherein the plurality of fully convolutional networks process the plurality of image patches in parallel.

15. The method of claim 11, wherein the tree structure network is a tree structure convolution recurrent neural network.

16. The method of claim 11, wherein the spatial constraint is determined based on a tree structure of the image patches.

17. The method of claim 11, wherein the spatial constraint is determined based on a spatial relationship between two neighboring image patches among the plurality of image patches.

18. The method of claim 11, wherein the convolutional network and the tree structure network are trained jointly using a gradient descent based method.

19. The method of claim 11, wherein the tree structure object is a blood vessel.

20. A non-transitory computer-readable medium having a computer program stored thereon, wherein the computer program, when executed by at least one processor, performs a method for segmenting a biomedical image including at least one tree structure object, the method comprising:
  receiving the biomedical image and a learning model, the biomedical image being acquired by an image acquisition device;
  extracting a plurality of image patches from the biomedical image; and
  applying the learning model to the plurality of image patches to segment the biomedical image, wherein the learning model includes a convolutional network configured to process the plurality of image patches to construct respective feature maps and a tree structure network configured to process the feature maps collectively to obtain a segmentation mask for the tree structure object, wherein the tree structure network models a spatial constraint of the plurality of image patches.

* * * * *